H. BOLTON.
Improvement in Animal Power.
No. 122,987. Patented Jan. 23, 1872.
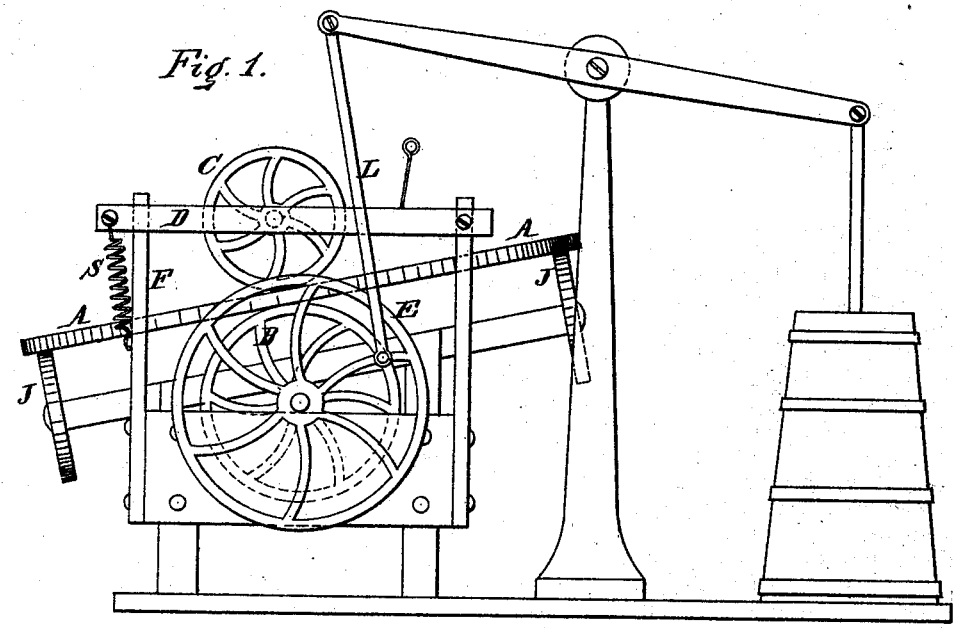
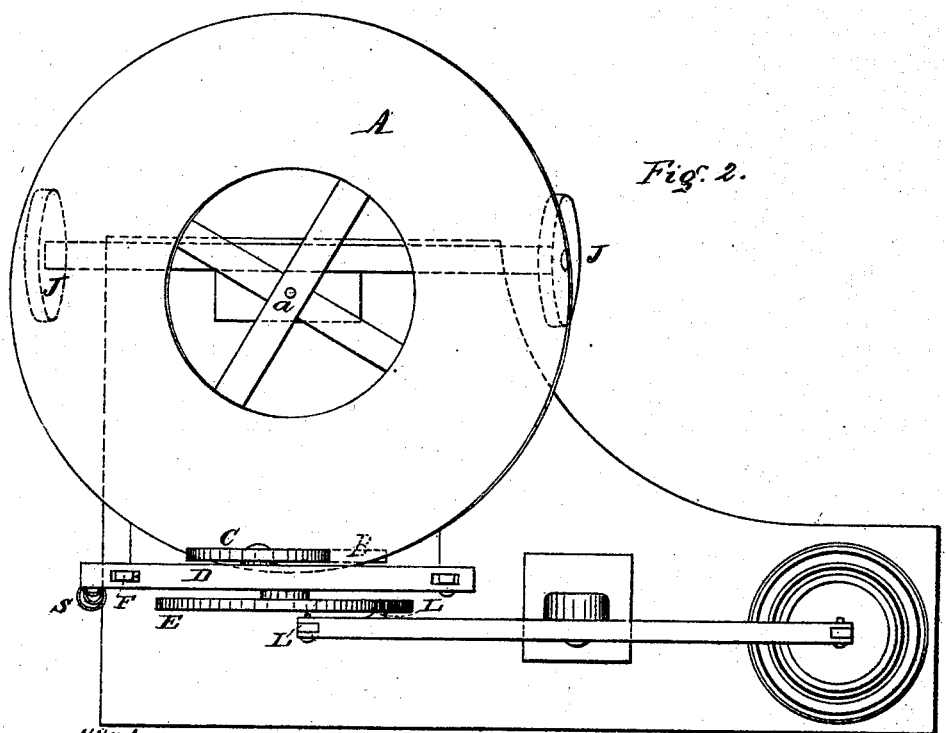
Witnesses.
Luther Hall Bellamy.
William Sherwood.
Inventor.
Henry Bolton

UNITED STATES PATENT OFFICE.

HENRY BOLTON, OF ELIZABETHTOWN, CANADA.

IMPROVEMENT IN ANIMAL-POWERS.

Specification forming part of Letters Patent No. 122,987, dated January 23, 1872.

I, HENRY BOLTON, of the township of Elizabethtown, in the county of Leeds, in the Province of Ontario, in the Dominion of Canada, carriage maker, have invented certain improvements in Dog-Powers, of which the following is a specification:

The nature and object of my invention are to apply the power derived from what is commonly known as a dog-power, in the most direct way and with the least possible loss from friction or other hindrance, to the churn or other machine which it is intended to drive, and my improvement, which I claim effects this, is made as follows: A circular platform-wheel of a size and weight suitable to be turned by a dog is set upon an axis slightly inclined from a horizontal position, and as this wheel is revolved by the dog it turns a vertical driving-wheel by contact of the periphery of the driving-wheel with the under surface of the platform. Immediately above the point of contact of the platform with the driving-wheel a vertical friction-roller, the periphery of which is in contact with the platform, governs the amount of pressure of the platform upon the driving-wheel, the axis of the friction-roller being upon a bar, which bar is raised or depressed by a spring attached to the end. To prevent the platform getting out of position two revolving journal-wheels support it at opposite points in its diameter.

In the accompanying drawing similar letters refer to similar parts in Figures 1 and 2.

A is the platform on which the dog walks, made circular, and slightly inclined from a horizontal position, revolving on the axis $a$, and near its circumference, on its under side, in contact with a vertical driving-wheel, B. The axis of the wheel B is a revolving axis, and to the end of it is attached the balance-wheel E, and to this wheel E the lever attachment L, to drive the churn, as shown in Fig. 1, or other desired machine. The amount of pressure of the platform A on the driving-wheel B is governed by a spiral (or other) spring, S, attached to the friction-bar D, the friction-bar D being movable up and down on the upright $f$, Fig. 1. The spring drawing down the bar, the friction-roller C (which turns on an axis attached to the bar) presses the platform A upon the driving-wheel B with any required force. Revolving journal-wheels J J, as shown, act as rollers under the platform, and prevent its getting out of position.

What I claim as my invention is—

For the arrangement of the platform-wheel A, the driving-wheel B, and the friction-roller C, in combination, as described and for the purposes named, and for the friction-bar D and spring S, as described, in combination with the friction-roller C, for the purposes named, and for the journals J J, as described, in combination with the platform A, for the purposes named.

HENRY BOLTON.

Witnesses:
LUTHER HALL BELLAMY,
WILLIAM SHERWOOD.